United States Patent
Tatehata et al.

(10) Patent No.: US 10,409,543 B2
(45) Date of Patent: Sep. 10, 2019

(54) AMPLIFICATION DEVICE, CONTROL METHOD OF AMPLIFICATION DEVICE, AND CONTROL PROGRAM

(71) Applicant: OMRON Corporation, Kyoto (JP)

(72) Inventors: Kazuki Tatehata, Ayabe (JP); Takeshi Takakura, Kyoto (JP)

(73) Assignee: OMRON Corporation, Kyoto (JP)

( * ) Notice: Subject to any disclaimer, the term of this patent is extended or adjusted under 35 U.S.C. 154(b) by 25 days.

(21) Appl. No.: 15/726,393

(22) Filed: Oct. 6, 2017

(65) Prior Publication Data

US 2018/0217799 A1    Aug. 2, 2018

(30) Foreign Application Priority Data

Jan. 30, 2017   (JP) ................. 2017-014775

(51) Int. Cl.
| | |
|---|---|
| G06F 3/14 | (2006.01) |
| G09G 3/04 | (2006.01) |
| G09G 3/20 | (2006.01) |
| G05B 19/042 | (2006.01) |
| G01J 1/44 | (2006.01) |

(52) U.S. Cl.
CPC ....... *G06F 3/1446* (2013.01); *G05B 19/0423* (2013.01); *G09G 3/045* (2013.01); *G09G 3/2085* (2013.01); *G01J 1/44* (2013.01); *G09G 2300/026* (2013.01); *G09G 2320/045* (2013.01); *G09G 2340/14* (2013.01); *G09G 2356/00* (2013.01)

(58) Field of Classification Search
CPC ............... G09G 3/045; G09G 3/2085; G09G 2300/023; G09G 2300/026; G09G 2360/04; G06F 3/1446; G01J 1/44
See application file for complete search history.

(56) References Cited

U.S. PATENT DOCUMENTS

| | | | |
|---|---|---|---|
| 6,717,515 B1 | 4/2004 | Osako et al. | |
| 2005/0094920 A1* | 5/2005 | Kamei | G02B 6/4292 385/12 |
| 2015/0109308 A1* | 4/2015 | Hanada | G01B 11/14 345/472 |

FOREIGN PATENT DOCUMENTS

| | | |
|---|---|---|
| DE | 102010032042 | 1/2011 |
| DE | 102011086647 | 5/2012 |
| JP | H11-126549 | 5/1999 |
| JP | 2015082775 | 4/2015 |

OTHER PUBLICATIONS

"Office Action of German Counterpart Application", dated Apr. 29, 2019, with English translation thereof, p. 1-p. 9.

* cited by examiner

*Primary Examiner* — Lisa S Landis
(74) *Attorney, Agent, or Firm* — JCIPRNET

(57) ABSTRACT

When a plurality of amplification devices each including a display unit are used in combination, deterioration in visibility of displayed information is prevented. An amplifier unit includes a connection mode specifying unit that detects another amplifier unit including another display unit which is disposed to form one display area along with the display unit and a display control unit that displays information in the display area formed by a plurality of display units.

7 Claims, 10 Drawing Sheets

AMPLIFICATION DEVICE, CONTROL METHOD OF AMPLIFICATION DEVICE, AND CONTROL PROGRAM

CROSS-REFERENCE TO RELATED APPLICATION

This application claims the priority benefit of Japan application serial no. 2017-014775, filed on Jan. 30, 2017. The entirety of the above-mentioned patent application is hereby incorporated by reference herein and made a part of this specification.

BACKGROUND OF THE INVENTION

Field of the Invention

The invention relates to an amplification device for a detection signal of a sensor and more particularly to display control in an amplification device including a display unit.

Description of Related Art

In a factory automation (FA) system and the like, various types of sensors are used. Some sensors include an amplifier unit (an amplification device) that amplifies a detection signal of the corresponding sensor, and some amplifier units include a display unit that displays information on the corresponding sensor. For example, a control device of a detector which is described in Patent Document 1 has a configuration in which a horizontally long display unit is disposed on one side surface of a flat housing.

PRIOR ART DOCUMENT

[Patent Document]
[Patent Document 1] Japanese Unexamined Patent Application Publication No. H11-126549 (published on May 11, 1999)

SUMMARY OF THE INVENTION

A plurality of amplifier units each having the same configuration as described above may be connected for use. However, when a plurality of amplifier units are used in this way, there is a problem in that visibility of information displayed on the display unit deteriorates. This problem will be described below with reference to FIG. 11. FIG. 11 is a diagram illustrating a problem when a plurality of amplifier units according to the related art are connected.

In the example illustrated in FIG. 11, six amplifier units 500 are arranged in a line and connected. Each amplifier unit 500 includes a display unit 501 and an operation unit 502. When the amplifier units 50 are connected in this way, visibility of information displayed on the display units 501 deteriorates. Accordingly, for example, when an error occurs in one of the amplifier units 500 and an error message is displayed on the display unit 501 of the amplifier unit 500, there is concern that display details on another display unit 501 adjacent to the display unit 501 will be overlooked. Even when the display details are not overlooked, there is concern that too much time will pass before display of an error is noticed.

The invention is made in consideration of the above-mentioned problem and an object thereof is to realize an amplifier device that does not deteriorate visibility of information even when a plurality of amplification devices including a display unit are used in parallel.

In order to achieve the above-mentioned object, according to an aspect of the invention, there is provided an amplification device having a function of amplifying a detection signal of a sensor and including a display unit that displays information on the sensor, the amplification device including: a device detecting unit configured to detect one or more amplification devices including a display unit that is disposed to form one display area along with the display unit; and a display control unit configured to display information in the display area formed by a plurality of display units.

According to this configuration, one or more other amplification devices including a display unit which is disposed to form one display area along with the display unit of the amplification device are detected, and information is displayed on the display area formed by a plurality of display units. Accordingly, information can be displayed in a mode which could not be displayed using only the display unit of the amplification device. As a result, it is possible to prevent deterioration in visibility of displayed information and to improve visibility.

The display control unit may display a part of the information on the display unit of the amplification device and display another part of the information on the display unit of another amplification device. According to this configuration, a series of information can be displayed in the display area formed by a plurality of display units of a plurality of amplification devices under control of the display control unit.

The display control unit may display a part of the information on the display unit of the amplification device using display data which is received from another amplification device. According to this configuration, a series of information can be displayed in the display area formed by a plurality of display units of a plurality of amplification devices under the control of another amplification device.

The information may include a character string which is arranged in an arrangement direction different from an arrangement direction of characters on the display unit of the amplification device and the display unit of another amplification device. According to this configuration, information including a character string which is arranged in an arrangement direction different from an arrangement direction of characters on the display unit of the amplification device and the display unit of the other amplification device is displayed. Accordingly, when a user has difficulty reading characters in the arrangement direction on the display unit of the amplification device and the display unit of the other amplification device, it is possible to improve readability of characters.

The display control unit may not display the information when the number of amplification devices forming the display area is less than a predetermined lower limit value. According to this configuration, when the number of amplification devices contributing to formation of the display area is less than the predetermined lower limit value, the information is not displayed. Accordingly, when the number of amplification devices is not sufficient to display the information, it is possible to prevent the information from being forcibly displayed.

The display unit of the amplification device and the display unit of another amplification device may be dot matrix type display units. A dot matrix type display unit has a higher degree of freedom of display details in comparison with a case in which a seven-segment display is used and thus can display more various types of information in comparison with the case in which a seven-segment display is used. It is also possible to easily change display details depending on the number of amplification devices contributing to formation of the display area.

In order to solve the above-mentioned problem, according to an aspect of the invention, there is provided a control method of an amplification device having a function of amplifying a detection signal of a sensor and including a display unit that displays information on the sensor, the control method including: a device detecting step of detecting one or more other amplification devices including a display unit that is disposed to form one display area along with the display unit; and a display control step of displaying information in the display area foiiued by a plurality of display units. According to this method, the same operational advantages as in the above-mentioned aspect can be achieved.

According to the aspects of the invention, deterioration in visibility of displayed information can be prevented even when a plurality of amplification devices including a display unit are used in parallel.

DESCRIPTION OF THE EMBODIMENTS

Device Configuration

Figure 1:
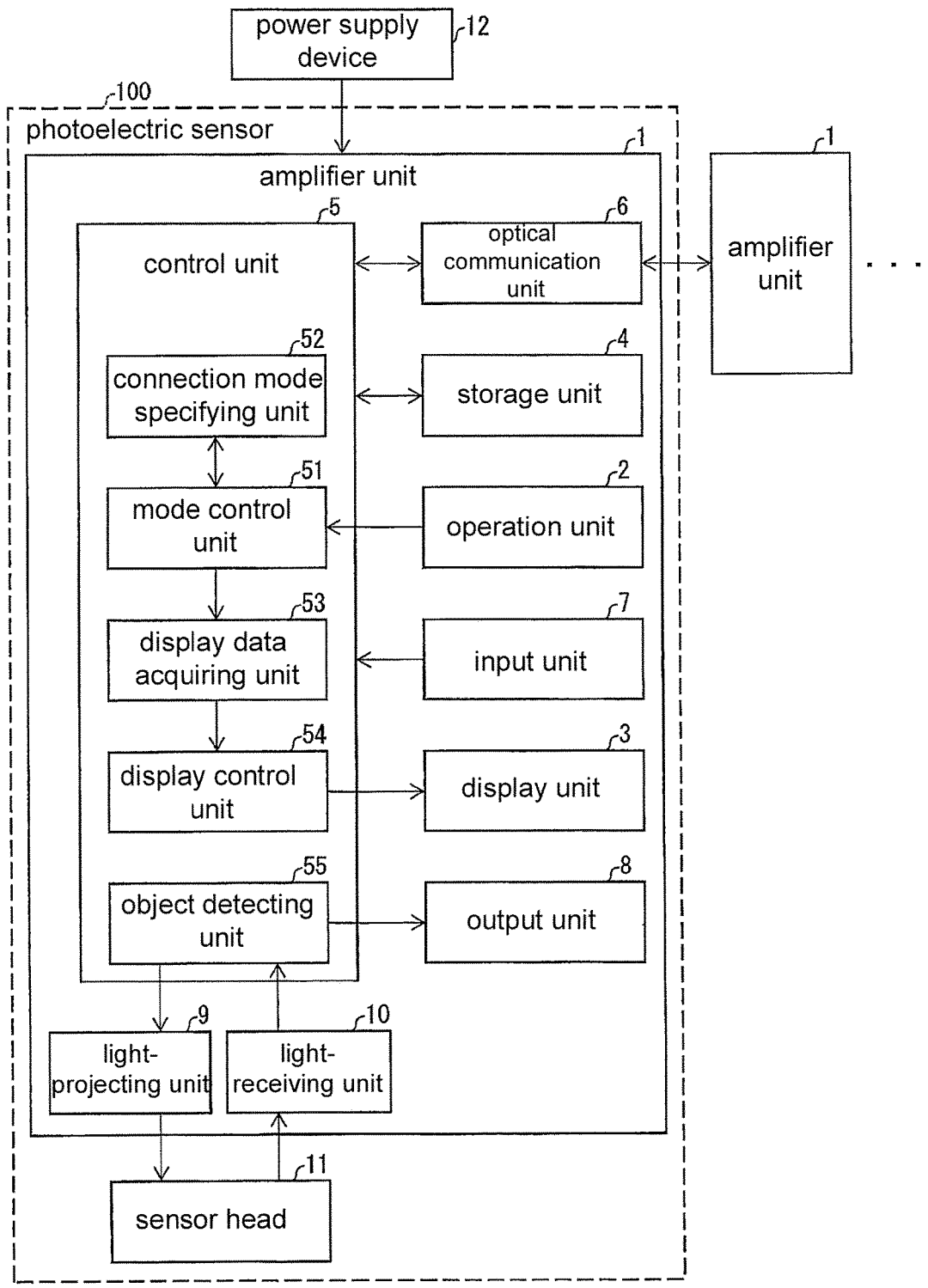
FIG. 1 is a block diagram illustrating an example of a configuration of principal parts of an amplifier unit according to an embodiment of the invention.
Figure 2:
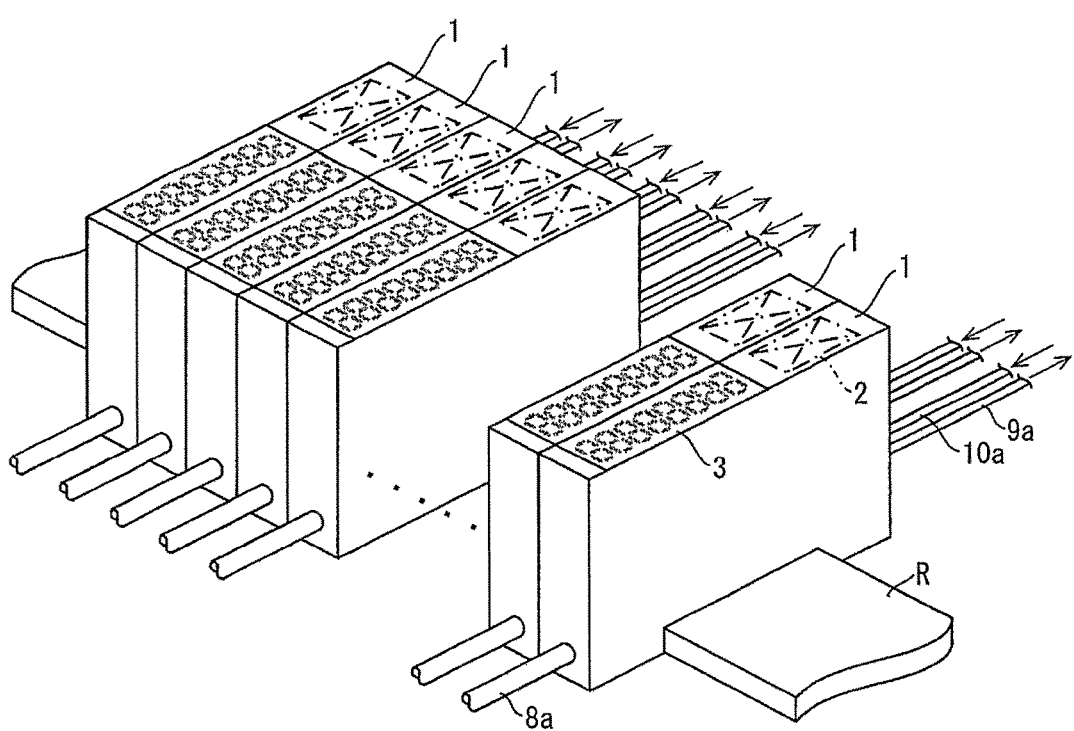
FIG. 2 is a perspective view illustrating a state in which a plurality of amplifier units are connected.

FIG. 1 is a block diagram illustrating an example of a configuration of principal parts of an amplifier unit (an amplification device) 1 according to an embodiment of the invention. FIG. 2 is a perspective view illustrating a state in which a plurality of amplifier units 1 are connected. A configuration of an amplifier unit according to an embodiment of the invention will be described below with reference to the drawings.

The amplifier unit 1 is a device constituting a photoelectric sensor 100 along with a sensor head (a sensor) 11. That is, the photoelectric sensor 100 is an amplifier-separated type sensor in which the sensor head 11 is separated from the amplifier unit 1. The sensor head 11 applies light to a detection area, receives reflected light thereof, and outputs the received light as a detection signal to the amplifier unit 1. The amplifier unit 1 amplifies the detection signal output from the sensor head 11 and determines whether a detection object is present in the detection area on the basis of the amplified detection signal. The amplifier unit 1 is connected to a power supply device 12 and operates with electric power supplied from the power supply device 12. A power supply source for the amplifier unit 1 is not limited to the example and any power supply source may be employed.

A plurality of amplifier units 1 are used to detect whether a detection object is present in a plurality of detection areas. In this case, the plurality of amplifier units 1 are arranged in parallel. For example, in the example illustrated in FIG. 2, a plurality of amplifier units 1 are arranged in parallel in the same direction on a rail R. More specifically, a plurality of amplifier units 1 are arranged such that the widest surfaces of the amplifier unit 1 having a flat parallelepiped shape face the widest surfaces of a neighboring amplifier unit 1 and a surface on which the display unit 3 is disposed faces upward. Accordingly, the display units 3 of the plurality of amplifier units 1 are arranged on one surface to form one display area. Although details will be described later, an amount of received light which is detected by the photoelectric sensor 100 can be displayed on the display units 3. The surface on which the display unit 3 is disposed is referred to as a top surface of the amplifier unit 1 and the surface connected to the rail R is referred to as a bottom surface of the amplifier unit 1. The surfaces (the widest surfaces) facing a neighboring amplifier unit 1 are referred to as main surfaces.

In the example illustrated in FIG. 2, an operation unit 2 that receives a user's input operation on the amplifier unit 1 is also disposed on the top surface of the amplifier unit 1. The operation unit 2 may be, for example, an operation button.

A light-projecting optical fiber 9a and a light-receiving optical fiber 10a protrude from one of the two surfaces other than the main surfaces among the side surfaces of the amplifier unit 1 to the outside of the housing of the amplifier unit 1. The light-projecting optical fiber 9a is connected to a light-projecting unit 9 illustrated in FIG. 1, and guides light emitted from the light-projecting unit 9 to the sensor head 11. The light emitted from the light-projecting unit 9 is applied from the sensor head 11 to a detection area. One end of the light-receiving optical fiber 10a is connected to the sensor head 11 and the other end thereof is connected to a light-receiving unit 10 illustrated in FIG. 1. The light-receiving optical fiber 10a guides light from the detection area received by the sensor head 11 to the light-receiving unit 10.

Connection lines 8a protrude from the other of the two side surfaces other than the main surfaces among the side surfaces of the amplifier unit 1 to the outside of the housing of the amplifier unit 1. The connection lines 8a are connected to a power supply device 12 illustrated in FIG. 1 and power is supplied to the amplifier unit 1 from the power supply device 12 via the connection lines 8a. The connection lines 8a may include an output signal line for transmitting an output signal from an output unit 8 illustrated in FIG. 1 to another device.

As illustrated in FIG. 1, the amplifier unit 1 includes a storage unit 4, a control unit 5, an optical communication unit 6, an input unit 7, an output unit 8, a light-projecting unit 9, and a light-receiving unit 10 in addition to the operation unit 2 and the display unit 3. Elements which are not directly associated with the invention of this embodiment are not illustrated.

The storage unit 4 stores a variety of data which is used by the amplifier unit 1. For example, an EEPROM (registered trademark) may be used as the storage unit 4. The control unit 5 comprehensively controls the units of the amplifier unit 1 and includes a mode control unit 51, a connection mode specifying unit (a device detecting unit) 52, a display data acquiring unit 53, a display control unit 54, and an object detecting unit 55.

The mode control unit 51 performs control of switching a display mode of the display unit 3. Display modes of the display unit 3 include a normal display mode in which information is displayed on a single display unit 3 and a connection display mode in which information is displayed in a display area formed by a plurality of display units 3.

The connection mode specifying unit 52 detects one or more other amplifier units 1 including a display unit 3 which is disposed to form a single display area along with the display unit 3. When another amplifier unit 1 connected to the amplifier unit 1 is detected, the connection mode specifying unit 52 determines whether the amplifier unit 1 is a master or a slave among the plurality of connected amplifier units 1. The amplifier unit 1 which is determined to be a master by the connection mode specifying unit 52 functions as a master and the amplifier unit 1 which is determined to be a slave functions as a slave. More specifically, the connection mode specifying unit 52 determines a master/slave relationship and recognizes the number of amplifier units connected, by transmitting and receiving synchronous signals to and from other amplifier units 1 via the optical communication unit 6. Although details will be described later with reference to FIG. 6, other amplifier units 1 connected thereto can be detected and which of a master and a slave its own channel (CH) number and stage corresponds to can be specified by transmitting and receiving the synchronous signals.

The display data acquiring unit 53 acquires display data for displaying information on the display unit 3. The display data acquiring unit 53 of the amplifier unit 1 serving as a master acquires the display data by generating the display data, and the display data acquiring unit 53 of the amplifier unit 1 serving as a slave acquires the display data by receiving the display data from another amplifier unit 1.

The display control unit 54 performs control of displaying information on the display unit 3. The display control unit 54 displays information on the display unit 3 in the normal display mode. On the other hand, the display control unit 54 displays information in a display area formed by a plurality of display units 3 in the connection display mode. In this case, the display control unit 54 causes the other amplifier units 1 to display information by transmitting the display data to the other amplifier units 1.

The object detecting unit 55 determines whether there is an object in a predetermined detection area by comparing a current amount of received light with a threshold value. Then, the object detecting unit 55 causes the output unit 8 to output a determination result.

The optical communication unit 6 functions to communicate with another neighboring amplifier unit 1. The optical communication unit 6 includes an input port and an output port of an optical signal (for example, an infrared signal), receives an optical signal from another neighboring amplifier unit 1 via the input port, and transmits an optical signal to another neighboring amplifier unit 1 via the output port. The input port may be disposed on one of the main surfaces of the amplifier unit 1, and the output port may be disposed on the other of the main surfaces. Accordingly, an optical signal can be sequentially transmitted between a plurality of amplifier units 1 by communication via the optical communication unit 6. A communication mode between the plurality of amplifier units 1 is arbitrary and is not limited to the communication mode using an optical signal.

The input unit 7 functions to receive an input signal from another device. Setting or operation control of the amplifier unit 1 may be performed by control via the input unit 7. The output unit 8 functions to output a determination result of the object detecting unit 55 to another device. The determination result may be output, for example, as a binary signal.

The light-projecting unit 9 functions to generate light to be applied to a detection area and to input the generated light to the light-projecting optical fiber 9a and includes a light source and a light-projecting circuit which are not illustrated. The light source may be, for example, a light emitting diode (LED). The light-projecting circuit may include an amplifier circuit.

The light-receiving unit 10 functions to receive light output from the light-receiving optical fiber 10a and includes a light-receiving element and a light-receiving circuit which are not illustrated. The light-receiving circuit may include an amplifier circuit that amplifies an output value of the light-receiving element and an A/D conversion unit that converts an output of the amplifier circuit (none of which is illustrated). The A/D conversion unit may be included in the control unit 5.

Display Example

Figure 3A:
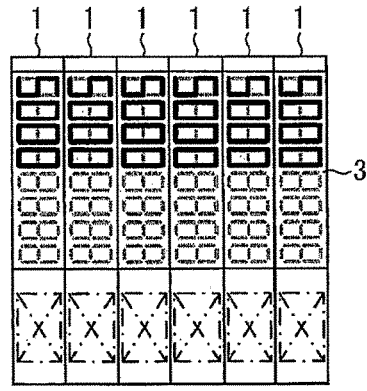
FIG. 3A to FIG. 3C are diagrams illustrating display examples in a normal display mode and a connection display mode.
Figure 3B:
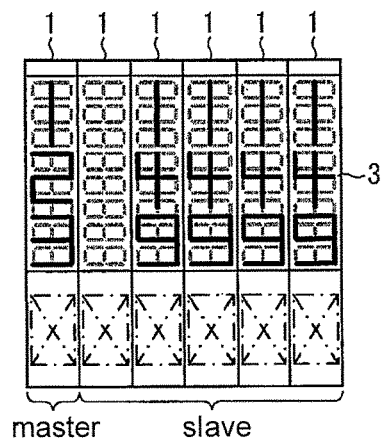
Figure 3C:
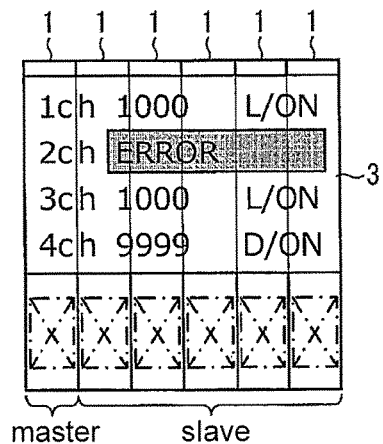

FIG. 3A to FIG. 3C are diagrams illustrating a display example in each of the normal display mode and the connection display mode. A display example in the normal display mode is illustrated in FIG. 3A. In the display example, six amplifier units 1 are connected, and the display unit 3 of each amplifier unit 1 displays a numerical value indicating a threshold value set for the corresponding amplifier unit 1 and a numerical value indicating an amount of received light which is detected by the corresponding amplifier unit 1. The display unit 3 in this display example is a seven-segment display that can horizontally display characters (numerals) in a line in the length direction of the display unit 3. More specifically, a four-digit numeral indicating a threshold value and a four-digit numeral indicating an amount of received light can be displayed on the display unit 3.

On the other hand, a display example in the connection display mode is illustrated in FIG. 3B. In this display example, six amplifier units 1 are connected as in FIG. 3A. In the display example illustrated in FIG. 3B, information is horizontally displayed in a single display area which is formed by the display units 3 of a plurality of amplifier units 1. More specifically, four-digit numerical values are displayed in three lines 1 to 3. 1111 is displayed in the first line, 4444 is displayed in the second line, and 9999 is displayed in the third line.

Each numeral is displayed using two or three neighboring areas among the areas in which one numeral is displayed in FIG. 3A. For example, flJ on the display unit 3 of the amplifier unit 1 at the right end is displayed using segments which are used to display three numerals of "5," "0," and "0" in FIG. 3A. Accordingly, the numerals displayed in the display example in FIG. 3B have a larger size than the numerals in the display example in FIG. 3A. The arrangement direction of numerals to be displayed rotates 90° counterclockwise in comparison with the display example illustrated in FIG. 3A, and thus the up-down direction of the display area matches the up-down direction of the numerals.

Accordingly, a user can more easily recognize numerical values in the display example illustrated in FIG. 3B in comparison with the display example illustrated in FIG. 3A.

In the connection display mode, the amplifier unit 1 located at the left end among a plurality of amplifier units 1 functions as a master and the other amplifier units 1 function as slaves. The amplifier units 1 functioning as slaves are caused to display information under the control of the amplifier unit 1 functioning as a master. In the following description, the left side of a plurality of connected amplifier units 1 is defined as upstream and the right side thereof is defined as downstream.

Another display example in the connection display mode is illustrated in FIG. 3C. In this display example, six amplifier units 1 are connected as in FIG. 3A. Similarly to FIG. 3A and FIG. 3B, the most upstream amplifier unit 1 functions as a master and the other amplifier units function as slaves. In this display example, the display units 3 are dot matrix type displays. In this case, a degree of freedom in display details is higher in comparison with a case in which a seven-segment display is used. For example, as illustrated in the drawing, information on a channel corresponding to each amplifier unit 1 may be displayed in detail as character information. Information indicating occurrence of an error may be displayed as character information and information to be particularly noted by a user may be displayed in a highlighted manner. Examples of the dot matrix type display include an organic electroluminescence (EL) display and a liquid crystal display.

Routine in Master

Figure 4:
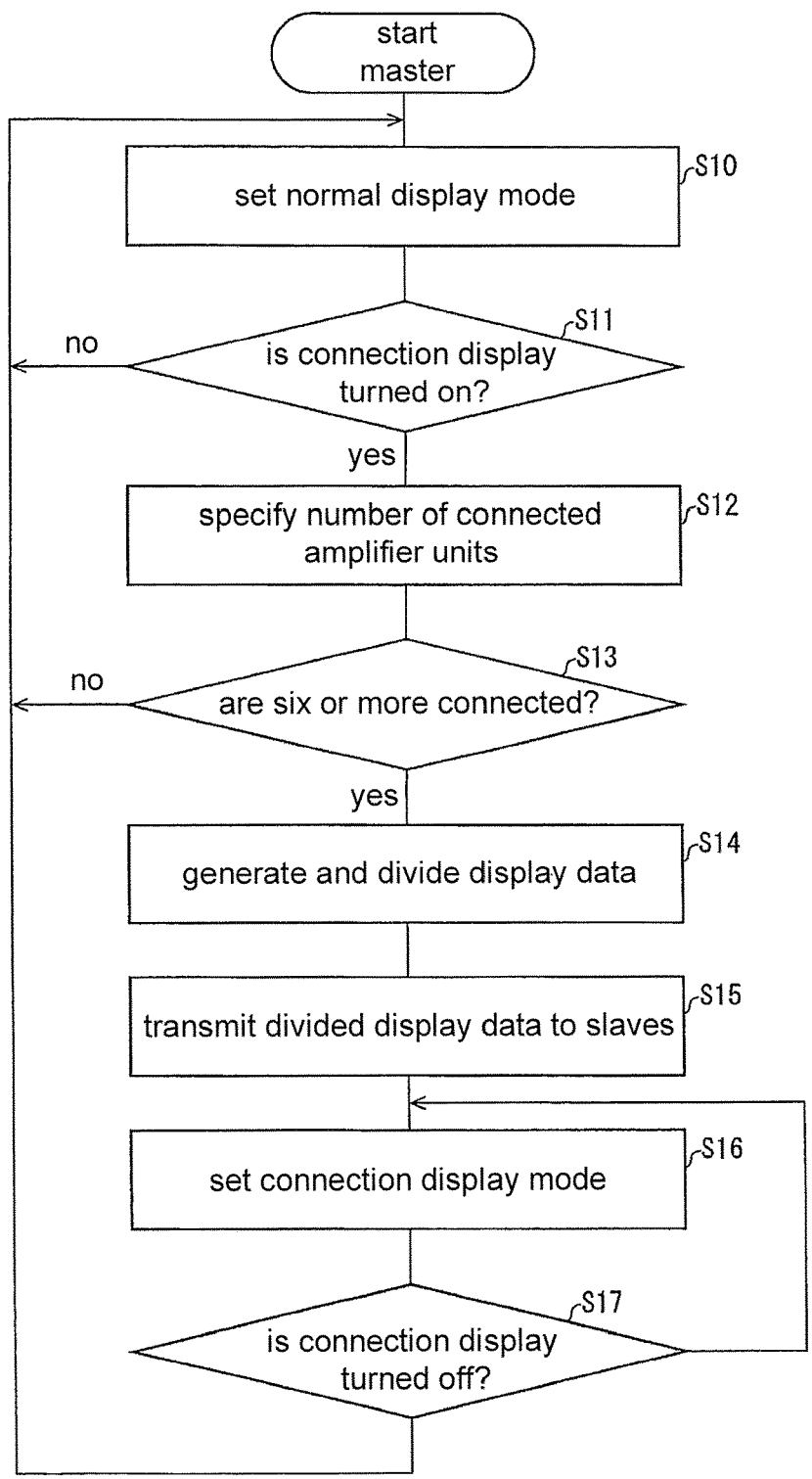
FIG. 4 is a flowchart illustrating an example of a routine which is performed by the amplifier unit serving as a master.

FIG. 4 is a flowchart illustrating an example of a routine (an amplification device control method) which is performed by an amplifier unit 1 serving as a master. Determination of a master and a slave will be described later with reference to FIG. 6.

First, the mode control unit 51 sets a display mode to the normal display mode (S10). Then, the mode control unit 51 waits for an input operation for turning on a connection display (S11). When an input operation for turning on a connection display is not detected (NO in S11), the routine returns to S10 and the normal display mode is maintained. On the other hand, when a user has performed an input operation for turning on a connection display on the operation unit 2 (YES in S11), the routine transitions to S12.

In S12 (a device detecting step), the connection mode specifying unit 52 detects other amplifier units 1 including a display unit 3 which is disposed to form a single display area along with its own display unit 3 and specifies the number of connected amplifier units 1. Subsequently, in S13, the connection mode specifying unit 52 determines whether the specified number of amplifier units is equal to or greater than six. When the specified number of amplifier units is less than six (NO in S13), the routine returns to S10 and the normal display mode is maintained. On the other hand, when the specified number of amplifier units is equal to or greater than six (YES in S13), the routine transitions to S14.

In S14, the display data acquiring unit 53 generates whole display data to be displayed on the amplifier units serving as a master and slaves and divides the generated display data to generate display data to be displayed on each amplifier unit 1.

Then, in S15 (a display control step), the display control unit 54 transmits the display data divided by the display data acquiring unit 53 to the amplifier units 1 serving as slaves to cause the amplifier units 1 to display predetermined information. The display control unit 54 displays predetermined information on the display unit 3 using a part corresponding to the amplifier unit 1 serving as a master among the display area divided by the display data acquiring unit 53. The predetermined information displayed on the display unit 3 is a part of information which is connected and displayed in the display area formed by a plurality of display units 3, and the information displayed on the other amplifier units 1 is other parts of the information which is connected and displayed.

Thereafter, the mode control unit 51 sets the display mode to the connection display mode (S16) and waits for an input operation for turning off the connection display (S17). When an input operation for turning off the connection display is not detected (NO in S17), the routine returns to S16 and the connection display mode is maintained. On the other hand, when a user performs an input operation for turning off the connection display on the operation unit 2 (YES in S17), the routine returns to S10 and the display mode is switched to the normal display mode.

In the example illustrated in FIG. 4, when the number of amplifier units 1 forming a display area is less than six, the display control unit 54 does not display information for the connection display. Accordingly, when the number of amplifier units 1 is not sufficient for the connection display, it is possible to prevent forcible connection display. Particularly, when the display unit 3 is a seven-segment display, one character is displayed using two or more neighboring display units 3. Accordingly, when the number of amplifier units 1 forming a display area is small, characters may not be correctly displayed or a series of characters may be over two or more lines, which deteriorates visibility of the characters. Accordingly, when the display unit 3 is a seven-segment display, it is preferable that a predetermined lower limit value be provided for the number of amplifier units 1 as in the example illustrated in FIG. 4 and the connection display not be performed when the detected number of amplifier units 1 is less than the predetermined lower limit value. The predetermined lower limit value is not limited to six and an arbitrary lower limit value can be used as long as visibility of display details can be secured. For example, the lower limit value may be set such that a width of a display area that can display a detected amount of received light of four digits in one line. An upper limit value may be provided for the number of amplifier units 1.

When dot matrix type display units 3 are used and the number of amplifier units 1 forming a display unit is small, characters can be correctly displayed by changing display details such as reducing a font size of characters. Accordingly, when dot matrix type display units 3 are used, the process of S13 may be skipped.

Routine in Slave

Figure 5:
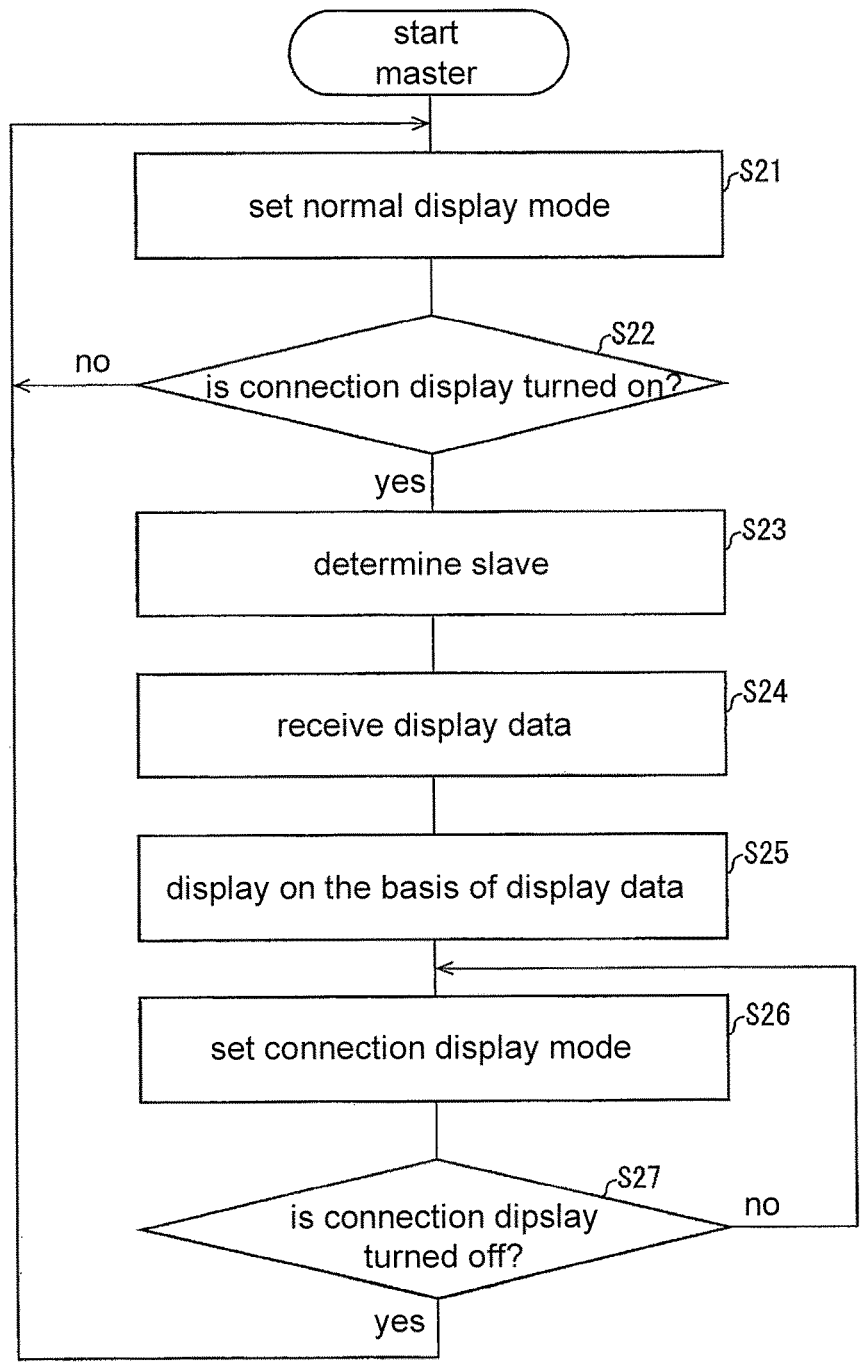
FIG. 5 is a flowchart illustrating an example of a routine which is performed by the amplifier unit serving as a slave.

FIG. 5 is a flowchart illustrating an example of a routine (an amplification device control method) which is performed by an amplifier unit 1 serving as a slave. A routine of an amplifier unit 1 serving as a slave which is adjacent to the amplifier unit 1 serving as a master will be described below.

First, the mode control unit 51 sets the display mode to the normal display mode (S21). The mode control unit 51 waits for an input for turning on the connection display (S22). When the input for turning on the connection display is not detected (NO in S22), the routine returns to S21 and the normal display mode is maintained. On the other hand, when an input for turning on the connection display is detected (YES in S22), the routine transitions to S23 (a device detecting step) and the connection mode specifying unit 52 detects presence of the amplifier unit 1 serving as a master and determines that its own amplifier unit is a slave.

When a user performs an input operation for turning off the connection display on the operation unit 2 of the amplifier unit 1 serving as a master, the amplifier unit 1 serving as a master may transmit an input signal for turning on the connection display to a neighboring amplifier unit 1 (slave). The amplifier unit 1 having received the input signal for turning on the connection display from the amplifier unit 1 serving as a master may transmit an input signal for turning on the connection display to another amplifier unit 1 adjacent to the amplifier unit 1. Accordingly, the input signal for turning on the connection display is transmitted from the amplifier unit 1 serving as a master to the amplifier units 1.

In this case, the determination of S22 is performed on the basis of the input signal received from the amplifier unit 1 serving as a master. Accordingly, a user can set all the plurality of amplifier units 1 to a connection display ON state by merely performing an input operation for turning on the connection display on the operation unit 2 of the amplifier unit 1 serving as a master. The method of setting the amplifier units 1 to the connection display ON state is not limited to the example. For example, the amplifier units 1 may be set to the connection display ON state by allowing a user to perform an input operation for turning on the connection display on the operation units 2 of the amplifier units 1.

In S24, the display data acquiring unit 53 receives display data from the amplifier unit 1 serving as a master. Then, in S25 (a display control step), the display control unit 54 displays predetermined information on the display unit 3 using the received display data. This information is a part of information which is connected and displayed in a display area formed by a plurality of display units 3.

Although not illustrated, the display control unit 54 transmits display data to be displayed in a downstream amplifier unit 1 among the display data, received from the amplifier unit 1 serving as a master, to the downstream amplifier unit 1. Accordingly, another part of the information to be connected and displayed is displayed on the display unit 3 of the downstream amplifier unit 1. When display data can be directly transmitted from the amplifier unit 1 serving as a master to the amplifier units 1 serving as slaves, the display data may be directly transmitted.

Thereafter, the mode control unit 51 switches the display mode to the connection display mode (S26) and waits for an input for turning off the connection display (S27). When an input for turning off the connection display is not detected (NO in S27), the routine returns to S26 and the connection display mode is maintained. On the other hand, when an input for turning off the connection display is detected (YES in S27), the routine returns to S21 and the display mode is switched to the normal display mode. The input for turning off the connection display may be received from another amplifier unit 1 or may be received via the operation unit 2, similarly to the input for turning on the connection display which has been described above with reference to S22.

Method of Determining Master and Slave

As described above, among a plurality of connected amplifier units 1, a most upstream amplifier unit 1 serves as a master and the other amplifier units 1 serve as slaves. An example of the method of determining a master and a slave will be described below with reference to FIG. 6. The following routine is performed, for example, when the amplifier unit 1 is started.

Figure 6:
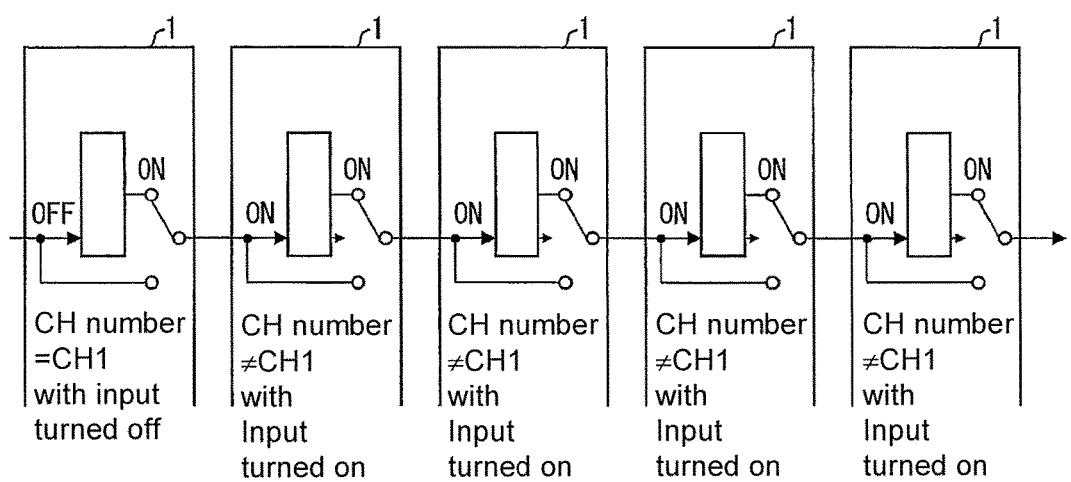
FIG. 6 is a diagram illustrating an example of a method of determining a master/slave.

FIG. 6 is a diagram illustrating an example of a method of determining a master and a slave. In the example illustrated in the drawing, five amplifier units 1 are connected. In FIG. 6, the amplifier units 1 are connected by solid lines, but each amplifier unit 1 wirelessly communicates with neighboring amplifier units 1 via the optical communication unit 6.

The connection mode specifying unit 52 of each amplifier unit 1 first sets both the input port and the output port of the optical communication unit 6 to general input/output allocation, turns on an internal pull-up for a predetermined time (for example, 10 ms), and turns off the internal pull-up when the predetermined time elapses. In the general input/output allocation, a universal asynchronous receiver transmitter (UART) is not used.

Then, the connection mode specifying unit 52 turns on the output port of the optical communication unit 6 and transmits a synchronous signal for a predetermined handshake (HS) time (for example, 70 ms). Here, the connection mode specifying unit 52 determines whether the input port is turned on in the HS time.

When it is determined that the input port is not turned on, that is, when an input to the input port is in an OFF state, the connection mode specifying unit 52 recognizes its own channel (CH) number to be 1. That is, the connection mode specifying unit 52 determines that its own amplifier unit is a master. In the example illustrated in FIG. 6, the connection mode specifying unit 52 of the amplifier unit 1 at the left end recognizes that the CH number is 1 and determines that its own amplifier unit is a master.

On the other hand, when it is determined that the input port is turned on, the connection mode specifying unit 52 recognizes that its own CH number is not 1. That is, the connection mode specifying unit 52 determines that its own amplifier unit is a slave. In the example illustrated in FIG. 6, the connection mode specifying units 52 of four amplifier units 1 other than the amplifier unit 1 at the left end recognize that their own CH number is not 1 and determines that their own amplifier unit is a slave.

The connection mode specifying unit 52 having determined that its own amplifier unit is a master (CH1) switches both the input port and the output port to the UART allocation. Then, the connection mode specifying unit 52 outputs a synchronization signal (for example, binary data of 10 bytes) indicating its own CH number from the output port to the amplifier unit 1 adjacent on the right side for a predetermined time (for example, 70 ms).

Then, the connection mode specifying unit 52 of the amplifier unit 1 having received the synchronization signal specifies a value, which is obtained by adding 1 to the CH number indicated by the synchronization signal, as its own CH number. Similarly to the connection mode specifying unit 52 of the master, the connection mode specifying unit 52 outputs a synchronization signal indicating the CH number from the output port to the amplifier unit 1 adjacent on the right side for a predetermined time. Thereafter, by performing the same process up to the most downstream amplifier unit 1, the connection mode specifying unit 52 of each amplifier unit 1 specifies its own CH number.

In S12 of FIG. 4, the connection mode specifying unit 52 can specify the number of connected amplifier units 1 by acquiring the CH number of the most downstream amplifier unit 1.

Other Display Examples

FIGS. 7 and 8 are diagrams illustrating other display examples when dot matrix type display units 3 are used. The display examples illustrated in FIGS. 7 and 8 are display examples when ten amplifier units 1 are connected. In such examples, the operation unit 2 is excluded from the surface on which the display unit 3 of the amplifier unit 1 is disposed and the entire surface is used as a display area. Accordingly, the display area in the connection display mode can be widened and a user can hardly recognize that an image is divided in the amplifier units 1. When the operation unit 2 is excluded from the surface on which the display unit 3 is disposed, the operation unit 2 may be disposed on another surface of the amplifier unit 1. In this case, a configuration in which a user's input operation is received via the display surface of the display unit 3 by forming the display unit 3 using a touch panel may be employed.

Figure 7A:
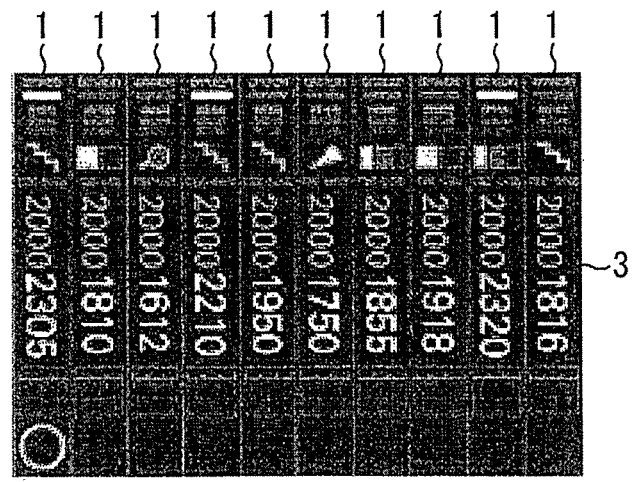
FIG. 7A to FIG. 7B are diagrams illustrating another display example when a dot matrix type display unit is used.

A display example in the normal display mode is illustrated in FIG. 7A. Accordingly, a numerical value indicating a threshold value set for the amplifier unit 1 and a numerical value indicating an amount of received light which is detected by the corresponding amplifier unit 1 are displayed on the display unit 3 of each amplifier unit 1. Character strings of the numerical values are horizontally displayed in the length direction of the display unit 3, and the arrangement direction of the character strings is a direction from top to bottom in the drawing.

Figure 7B:
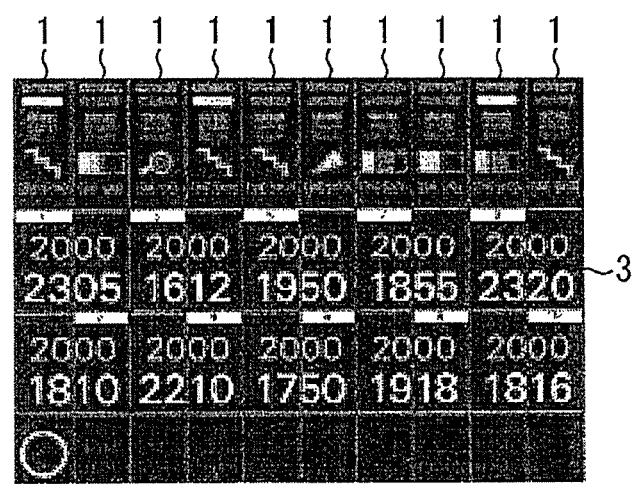

On the other hand, FIG. 7B illustrates a display example in the connection display mode. Information displayed in this display example includes a numerical value indicating a threshold value and a numerical value indicating an amount of received light, similar to FIG. 7A and is different from the display example illustrated in FIG. 7A in the arrangement direction (a direction of character strings) and arrangement of the numerical values. Specifically, in the display example illustrated in FIG. 7B, the display area which is formed by the display units 3 of ten amplifier units 1 is divided into two rows×five columns and a numerical value is displayed in a set of two stages for each section. The upper stage is a numerical value indicating the threshold value and the lower stage is a numerical value indicating the amount of received light. The arrangement direction of the character strings is a direction from left to right in the drawing, that is, a direction in which the plurality of amplifier units 1 are arranged. More specifically, numerical values indicating the threshold value and the amount of received light of two neighboring amplifier units 1 are displayed on the display units 3 of the amplifier units 1. For example, (2000, 2305) and (2000, 1810) are displayed as the numerical values indicating the threshold values and the amounts of received light of the leftmost amplifier unit 1 and the amplifier unit 1 adjacent thereto on the display units 3 of the amplifier units 1. In this way, the connected amplifier units 1 may be divided into a plurality of groups and information on the amplifier units 1 belonging to each group may be displayed on the display units 3 of the group. Accordingly, correspondence between the displayed information and the amplifier units 1 can be easily recognized by a user.

Figure 8A:
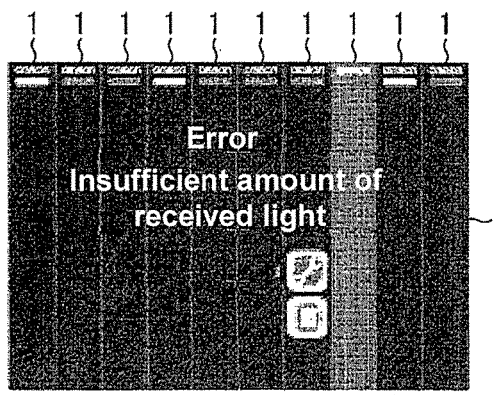
FIG. 8A to FIG. 8D are diagrams illustrating another display example when a dot matrix type display unit is used.

An example of information which is displayed when an error occurs in one of the amplifier units 1 is illustrated in FIG. 8A. In this example, a message indicating occurrence of an error and details of the error (for example, an insufficient amount of received light) is displayed. In this way, by connecting the dot matrix type display units 3 and displaying information thereon, it is possible to clearly and visibly deliver occurrence of an error and details of the error to a user. Since different background colors are displayed on the display unit 3 of the amplifier unit 1 in which an error has occurred and the display units 3 of the other amplifier units 1, the amplifier unit 1 in which an error has occurred can be easily recognized by a user. In the display example illustrated in FIG. 8A, choices of a process to be performed due to occurrence of an error are displayed. Accordingly, it is possible to enable a user to rapidly and correctly cope with an error. When the display unit 3 is configured by a touch panel, the amplifier unit 1 may specify a choice selected by a user from a user's touch position with the display unit 3 which is detected using the touch panel and perform a process corresponding to the specified choice. For example, when the choice selected by a user is switching of an operation mode of the amplifier unit 1, the mode control unit 51 may switch the operation mode.

Figure 8B:
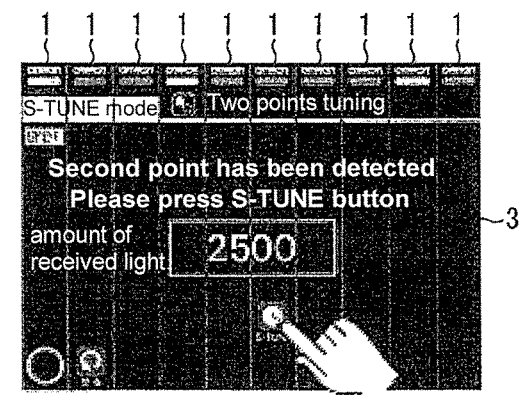

An example in which a setting screen for setting the amplifier 1 is displayed is illustrated in FIG. 8B. By connecting the dot matrix type display units 3 and displaying information thereon in this way, setting of the amplifier units 1 may be easily performed by a user. In this example, the display unit 3 may be configured by a touch panel. Accordingly, a setting operation order can be connected and displayed to enable a user to intuitively and smoothly perform the setting. Similarly, a display screen for controlling another device connected to the amplifier unit 1 or the like may be displayed and another device may be controlled in response to a user's operation on the display screen.

Figure 8C:
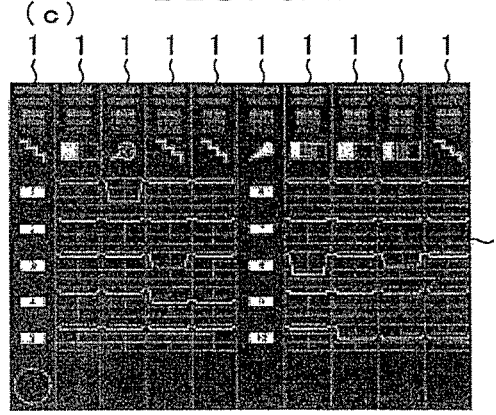

An example in which a graph (a trend graph) indicating a change over time of an amount of received light which is detected by each amplifier unit 1 is displayed is illustrated in FIG. 8C. As in this example, according to the connection display, information with a large size which could not be displayed on a single display unit 3 can be displayed.

Figure 8D:
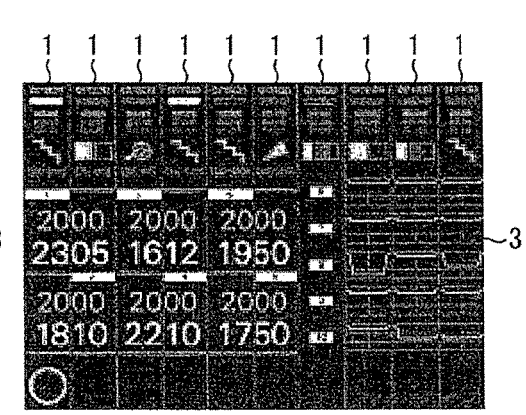

An example in which both numerical values indicating the threshold values and the amounts of received light of the amplifier units 1 and a trend graph thereof are displayed is illustrated in FIG. 8D. As in this example, according to the connection display, different types of information may be displayed in parallel.

The arrangement direction of character strings in the connection display mode may be set to the same as the arrangement direction of character strings in the normal display mode. Similarly to a case in which a plurality of amplifier units 1 are superimposed and arranged, character strings may be more easily read when the arrangement directions of character strings are the same. The direction of the display area may be detected by a user's input operation or by adding an acceleration sensor to the amplifier units 1 or the like and the character strings may be displayed in the arrangement direction corresponding to the direction of the display area. Accordingly, it is possible to always display character strings in an easily viewable direction without depending on an installation type of a plurality of amplifier units 1.

Generation of Display Data

Generation of display data in the amplifier unit 1 serving as a master will be described below. The display data acquiring unit 53 of the amplifier unit 1 serving as a master acquires data indicating the amounts of received light and the threshold values of the amplifier units 1 serving as slaves, for example, by communication via the optical communication unit 6 and generates display data on the basis of the acquired data. For example, when ten amplifier units 1 are connected, the display data acquiring unit 53 of the amplifier unit 1 serving as a master specifies an amount of received light which is detected by its own amplifier unit and a threshold value which is set by its own amplifier unit. The display data acquiring unit 53 specifies amounts of received light and threshold values of the nine amplifier units 1 serving as slaves. The amounts of received light and the threshold values may be transmitted in the nine amplifier units 1 serving as slaves in a relay manner and the amounts of received light and the threshold values of the nine amplifier units may be transmitted from the most downstream amplifier unit 1 serving as a slave to the amplifier unit 1 serving as a master.

Then, the display data acquiring unit 53 generates display data for displaying information with a size corresponding to the size of a display area which is formed by the display units 3 of the ten amplifier units 1. For example, when the height of each display unit 3 is defined as a, the width thereof is defined as b, and the display units 3 are arranged in a line in the width direction, display data with a size of a (height)× 10b (width) is generated. Then, the generated display data is divided into ten parts in the width direction to generate display data which is displayed by each amplifier unit 1.

When the display unit 3 is configured by a seven-segment display, the display data acquiring unit 53 determines display details of each amplifier unit 1 depending on the number of connected amplifier units 1 and generates display data indicating the determined display details.

System Configuration Example 1

Figure 9:
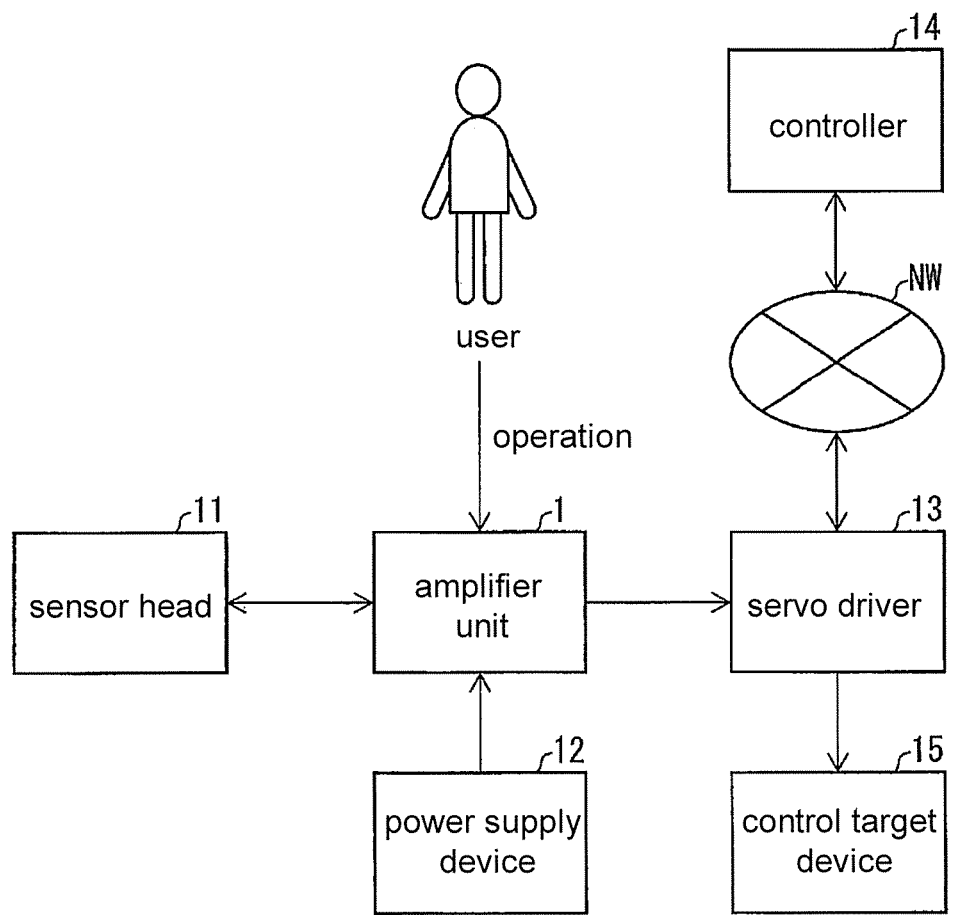
FIG. 9 is a diagram illustrating an example of an FA system including the amplifier unit.

FIG. 9 is a diagram illustrating an example of an FA system including amplifier units 1. The FA system illustrated in FIG. 9 includes an amplifier unit 1, a sensor head 11, a power supply device 12, a servo driver 13, a controller 14, and a control target device 15. Although not illustrated in the drawing, the FA system illustrated in FIG. 9 includes a plurality of amplifier units 1, a plurality of sensor heads 11, and a plurality of power supply devices 12. The same is true of FIG. 10 which will be described later.

The servo driver 13 is a device that controls an operation of the control target device 15 and details of the operation control are based on an output value of the amplifier unit 1. The control target device 15 performs an operation based on the output value of the amplifier unit 1 under the control of the servo driver 13. The control target device 15 is, for example, an actuator. In this case, for example, when the output value of the amplifier unit 1 is a value indicating that a detection object is present, the actuator can be activated to perform predetermined processing on the detection object and the like.

The controller 14 is a control device that comprehensively controls the FA system as a whole and is also referred to as a programmable logic controller (PLC). The controller 14 is connected to the servo driver 13 via an NW and can perform the operation control of the servo driver 13 or can acquire a determination result of presence of an object or data indicating an amount of received light from the amplifier unit 1 via the servo driver 13.

The NW denotes a network and may be, for example, a local area network (LAN). Communication via the NW may be performed, for example, by EtherCAT (Ethernet Control Automation Technology: registered trademark).

In the FA system illustrated in the drawing, since the controller 14 can acquire the determination result of presence of an object or data indicating the amounts of received light which is output from a plurality of amplifier units 1, a configuration in which the above-mentioned display data is generated by the controller 14 may be employed. In this case, the connection display may be realized by allowing the controller 14 to transmit the display data to the amplifier units.

System Configuration Example 2

Figure 10:
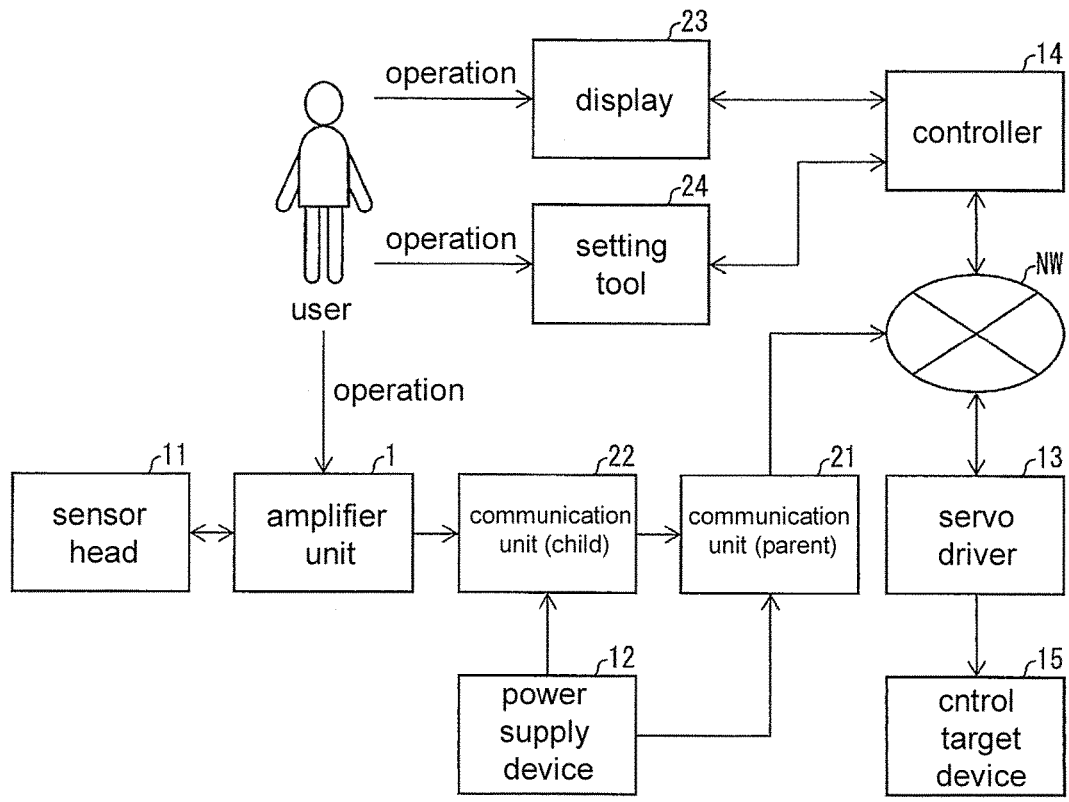
FIG. 10 is a diagram illustrating another example of the FA system including the amplifier unit.
Figure 11:
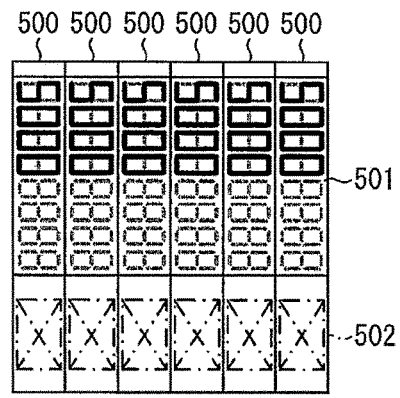
FIG. 11 is a diagram illustrating a problem when a plurality of amplifier units according to the related art are connected.

FIG. 10 is a diagram illustrating another example of the FA system including an amplifier unit 1. The FA system illustrated in FIG. 10 further includes a communication unit (parent) 21, a communication unit (child) 22, a display 23, and a setting tool 24 in addition to the configuration of the FA system illustrated in FIG. 9. The same configuration as illustrated in FIG. 9 will not be repeatedly described.

The communication unit (parent) 21 is a communication device for connecting the amplifier unit 1 to the NW. A determination result of presence of an object or data indicating an amount of received light, which are output from the amplifier units 1, can be transmitted to the devices such as the controller 14 connected to the NW and the servo driver 13 via the communication unit (parent) 21. The communication unit (parent) 21 may be used alone or may be used in combination with the communication unit (child) 22. The communication unit (child) 22 functions to connect the plurality of amplifier units 1 to the communication unit (parent) 21. By using the communication unit (child) 22, more amplifier units 1 can be connected in comparison with a case in which only the communication unit (parent) 21 is used. In the FA system illustrated in FIG. 10, the power supply device 12 is connected to the communication unit (parent) 21 and the communication unit (child) 22. Power is supplied to the amplifier unit 1 via the communication unit (parent) 21 and the communication unit (child) 22.

The display 23 is a touch panel type display input device and a user of the FA system can operate the controller 14 via the display 23 or confirm the operating state of the FA system through the display 23. The FA system illustrated in FIG. 9 may include the display 23 and the setting tool 24.

The setting tool 24 is a device that is connected to the FA system for use for the purpose of setting of operations of the devices included in the FA system. The setting tool 24 can access the devices in the FA system via the controller 14. An information processing device such as a PC can be used as the setting tool 24, or a portable information processing device such as a notebook personal computer may be used.

In the FA system illustrated in the drawing, since the setting tool 24 can acquire the determination result of presence of an object or the data indicating the amount of received light which is output from the plurality of amplifier units 1, a configuration in which the above-mentioned display data is generated by the setting tool 24 may be employed. In this case, the connection display may be realized by causing the setting tool 24 to transmit display data to the amplifier units.

Modified Example

In the above-mentioned embodiment, an amplifier unit 1 which may function as a master or may function as a slave depending on a connection relationship has been described. However, an amplifier unit which functions as a master but does not function as a slave and an amplifier unit which functions as a slave but does not function as a master may be used. In this case, when an amplifier unit functioning as a master and an amplifier unit functioning as a slave are connected in a predetermined order, the connection display described in the above-mentioned embodiment is possible. In this case, since the functions are limited and thus the configuration of the amplifier unit is simplified by as much, it is possible to manufacture an amplifier unit at a lower cost in comparison with the amplifier unit 1 according to the above-mentioned embodiment.

In the above-mentioned embodiment, the amplifier unit 1 of the photoelectric sensor 100 has been exemplified, but the invention can be applied to an amplifier unit connected to an arbitrary sensor. Amplifier units of different types of sensors may be connected and connection display may be performed on the display units thereof. The amplifier units 1 may be configured to connect a plurality of sensor heads and to amplify and display outputs of the sensor heads. The above-mentioned amplifier unit 1 amplifies an optical signal, but an amplifier unit that receives a voltage or a current output from a sensor as an input signal and amplifies the input signal is also included in the scope of the invention.

Embodiment by Software

The control blocks of the amplifier unit 1 (particularly, the mode control unit 51, the connection mode specifying unit 52, the display data acquiring unit 53, the display control unit 54, and the object detecting unit 55) may be embodied by logical circuits (hardware) which is formed in an integrated circuit (an IC chip) or the like. The control blocks may be embodied by software using a central processing unit (CPU).

In the latter, the amplifier unit 1 includes a CPU that executes a command of a program which is software for embodying the functions, a read only memory (ROM) or a storage device (which is referred to as a "recording medium") in which the program and a variety of data are stored in a computer (or CPU)-readable manner, and a random access memory (RAM) into which the program is loaded. The object of the invention is achieved by causing the computer (or the CPU) to read and execute the program from the recording medium. Examples of the recording medium include "non-transitory physical mediums" such as a tape, a disk, a card, a semiconductor memory, and a programmable logic circuit. The program may be supplied to the computer via an arbitrary transmission medium (such as a communication network or broadcast waves) that can transmit the program. The aspects of the invention may also be realized in the form of data signals which are embedded in carrier waves in which the program is embodied by electronic transmission.

The invention is not limited to the above-mentioned embodiments and can be modified in various forms within the scope described in the appended claims, and an embodiment obtained by appropriately combining technical means described in different embodiments is included in the technical scope of the invention.

What is claimed is:

1. An amplification device having a function of amplifying a detection signal of a sensor and including a display unit that displays information on the sensor, the amplification device comprising:

a processor configured to detect one or more amplification devices including a display unit that is disposed to form one display area along with the display unit; and the processor configured to display information in the display area formed by a plurality of display units, wherein the processor displays a part of the information on the display unit of the amplification device and displays another part of the information on the display unit of another amplification device.

2. The amplification device according to claim 1, wherein the processor displays a part of the information on the display unit of the amplification device using display data which is received from another amplification device.

3. The amplification device according to claim 1, wherein the information includes a character string which is arranged in an arrangement direction different from an arrangement direction of characters on the display unit of the amplification device and the display unit of another amplification device.

4. The amplification device according to claim 1, wherein the processor does not display the information when the number of amplification devices forming the display area is less than a predetermined lower limit value.

5. The amplification device according to claim 1, wherein the display unit of the amplification device and the display unit of another amplification device are dot matrix type display units.

6. A control method of an amplification device having a function of amplifying a detection signal of a sensor and including a display unit that displays information on the sensor, the control method comprising:

a device detecting step of detecting one or more other amplification devices including a display unit that is disposed to form one display area along with the display unit; and a display control step of displaying information in the display area formed by a plurality of display units, wherein in the display control step, a part of the information is displayed on the display unit of the amplification device and another part of the information is displayed on the display unit of another amplification device.

7. A control program causing a computer to function as the amplification device according to claim 1.

* * * * *